March 16, 1937. M. OZLEK 2,073,754
LAMP STAND
Filed Jan. 4, 1934
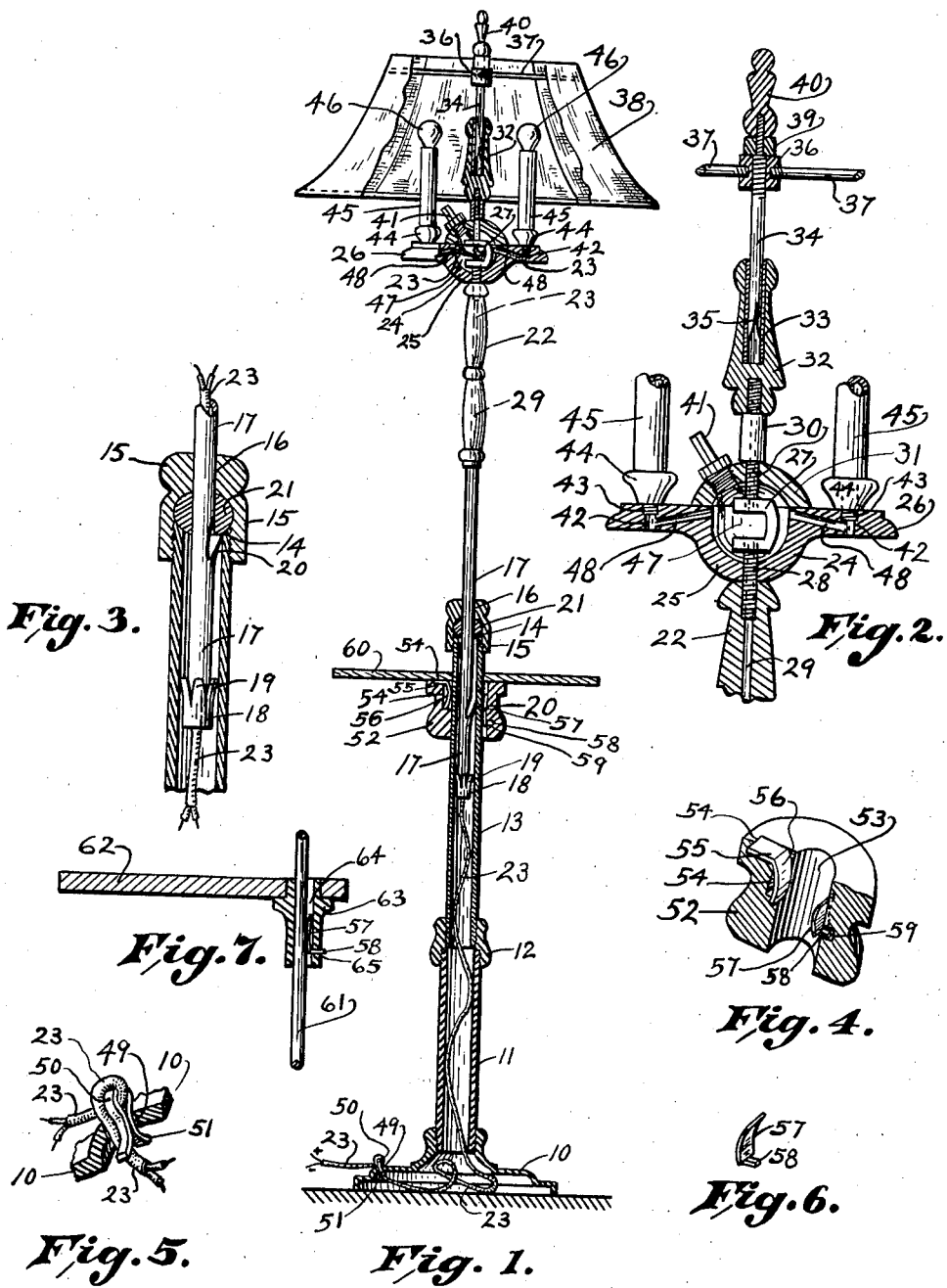
Inventor,
Morris Ozlek,
by his attorney,
J. Edward Thebaud Patented Mar. 16, 1937

2,073,754

UNITED STATES PATENT OFFICE 2,073,754

LAMP STAND

Morris Ozlek, Philadelphia, Pa.

Application January 4, 1934, Serial No. 705,265

3 Claims. (Cl. 240—81)

This invention relates to lamp stands.

The ordinary forms of adjustable electric lamp stands and tables are faulty in various parts of their construction, particularly in their adjustable features. When adjusting a lamp stand with respect to its height, the electric cable or cord, inside of the members of the stand, will chafe or cut and become tangled, unless special provision is made to overcome these difficulties and embodied in the construction of the stand. The cord usually passes through a hole in the base from the outside and is left free to move through the hole during a lengthening of the stand for additional height, or is free to be pulled out from its slack condition, when moving the lamp stand and unwittingly tightening the cord by yanking the lamp to some extended position, leaving no slack cord within the stand to permit of the easy extension of the stand in height, requiring the pulling back of the cord within the base, through the hole therein, causing wear upon the cloth armour of the cord.

The objects of my invention are to provide improvements which will overcome in detail, the faults pointed out above, and include a frictional joint construction permitting an easy sliding of the parts joined, when manually moved in adjustment, while affording a normal holding friction which will not slip of its own accord, after the parts have been normally adjusted, as desired. In this connection I have a further object to provide a simple and inexpensive frictional element that can always be relied upon to keep the joint in reliable functioning condition, irrespective of ordinary wear, for a long time.

A further object is to provide a simple form of frictional element which will operate within a comparatively small space between parts connected to telescope one another.

A further object is to provide a simple form of spring friction element which, when assembled with a sliding joint, will be anchored therein and provide a reliable and constant amount of friction to the joint, while bearing against the main member of the device, having such a joint, along which another member is manually slid for position, to be held there, by the frictional means, until further manually adjusted. In this case, the main member may be any kind of a stand or arm upon which a transverse member is manually positioned or slid, which may be a bracket, a table top or another arm.

Another object is to provide a simple and inexpensive form of adjustable frictional joint between sliding or telescoping members of stands of tables, affording means for adjusting and fixing the amount of friction it is desired to have this joint exert and maintain, for a normal holding and manually forced adjustment of the relative position of the parts so joined.

A further object is to provide with telescoping members a spur element, which, while being part of one member, will frictionally bear against the other member, and at the same time co-operate with a stop, and will come against whatever closure forms part of the sliding joint, between the telescoping members, while serving to prevent the pulling apart of the members, when manually adjusting them. I desire also to provide in combination with the spur element, a centering frictional member, spaced from the spur element, and acting to keep the joined members in alignment.

Another object is to provide with a lamp stand, a separable and flanged bowl member for supporting the parts upon which the lighting bulbs are mounted and to have bored in the bowl wall and flange, holes having convenient relative directions, affording easy threading passages for the attached electric cords, thus saving time in assembling the same at the factory.

A further object of my invention is to form the lower part of the lamp stand of two tubular members, one above the other, having the lower one of a larger bore than the upper one, to facilitate the movement of the electric cord passing up through them, so as to prevent the crowding of the cord upon itself and giving freedom to whatever bends occur, and permit the formation of larger bends toward the base of the stand, for the freer movement of the cord in the whole length of the tubular and telescopic stand.

I also desire to provide a simple and quickly assembled cord joint for fixing the electric cord where it passes through a hole in the base of the stand, so that the cord can not move in or out of the hole in the base and chafe or cut, once sufficient cord is left inside the stand for its fullest extension in height, and thus avoid any outside interference with the amount of cord designed to remain within the stand for all its adjustments.

A further object is to provide with a stand, a table top surrounding the upright member of the stand upon which it is mounted for vertical adjustment, in which case the stand may be a lamp stand extending above the table to support lamps and shades, or the stand may only form an upright member to support the table at various manually adjusted and frictionally held heights.

In connection with a lamp stand, my object is to have the table top manually adjusted, independent of any other adjustments of the stand itself.

With these and other objects, which will hereinafter appear, my invention resides in certain construction, various embodiments of which are illustrated in the drawing. The parts are described, their functioning is explained, and what I claim is set forth.

In the drawing,

Figure 1 is a sectional, assembled elevation of a lamp stand and table, embodying my invention.

Figure 2 is an enlarged sectional elevation of the upper parts of the stand shown in Figure 1, but here having the electric cord omitted.

Figure 3 is an enlarged sectional elevation of the mid-portion of the stand, showing particularly the manually adjustable friction means, with the spur element stopped against it.

Figure 4 is a perspective view of a fragment of the spring friction, holding block, which supports the table top on the stand.

Figure 5 is a perspective view showing the formation of the cable fixing joint, including a cotter pin, illustrated on a fragment of the base shell.

Figure 6 is a perspective view of a leaf spring, frictioning element.

Figure 7 is a sectional elevation of two joined members with my frictioning element affording frictional holding means for the transverse member.

In the figures, there is shown screwed into the base shell 10, the tubular member 11, upon the top of which is threaded the collar 12. Screwed into the collar 12 is the tubular member 13, smaller in bore than the bore of the member 11. The upper end, of the wall, of the member 13 is beveled convergently downward at 14. Threaded upon the outside of the upper end of the member 13 is the sleeve 15, having an axial hole 16, in sliding engagement with which is the tubular member 17, which extends down into the member 13 and has at its lower end, a spring fingered piece 18, having the ends of the fingers 19 in spring pressed and frictional engagement with the inner wall of the tubular member 13. Spaced above the piece 18 is the spur 20, which spring presses against the inner wall of the member, exerting preferably an appreciable friction, while being in sliding engagement therewith.

Within the sleeve 15 and contacting the tubular member 17, which it surrounds, is the flexible packing ring 21, having a semi-circular section between the sleeve 15 and the member 17 and preferably made of suitable, compressible wood, adapted to fit into the beveled end 14, of the member 13, and the rounded inside upper part of the sleeve 15, so as to compress against the tube 17, when the sleeve 15 is screwed down. The member 17 is slightly spaced from the surrounding member 13 and the spur 20 is adapted to stop against the packing ring 21 on its way up, as shown in Figure 3.

In threaded engagement with the upper end of the tube 17 is the tubular handle 22, through which the electric cord or cable 23 passes. Surmounting the handle 22 is the flanged bowl 24, having a bowl body 25 and a circular flange 26. Within the bowl body 25 is the C-frame or hickey 27, having a tubular, threaded extension 28, passing down through the bowl body 25 and engaging the handle 22. The bore of the extension 28 is in line with the cable hole 29, in the handle 22. An upper extension 30, to the C-frame 27, passes up through the curved bowl cover 31 and engages the shade support 32. In the upper part of the shade support 32 is the axially positioned metal tubular bushing 33, in which slides the rod 34, having its lower end split at 35, for frictional and sliding engagement with the bushing 33. If desired, the bushing 33 can be omitted and the rod 34 can fit an axial hole in the support 32, in sliding engagement therewith. The central shade nut 36 is fixed to the upper end of the rod 34 and has radiating spokes 37, connected with the frame of the shade 38, in the usual manner. Above the nut 36 is another nut 39, engaging the rod 34. Fixed to the top of the rod 34 is the finial or cap ornament 40.

Referring again to the bowl 24 and its cover 31, there is a canopy switch 41, fixed to the cover 31. The flange 26, of the bowl 24, has vertical holes 42, in the upper part of each is screwed a nipple 43, holding a light tube base 44, upstanding from which is a light tube 45, supporting a light bulb 46. Leading radially from the bowl cavity 47, to each hole 42, is an inclined cable hole 48, which opens into the lower open end of the hole 42. Considering now the wire cable 23, where it passes through the hole 49, in the base shell 10, it is shown (more clearly in Figure 5) to pass out through the hole 49 and over and through the loop 50, of the cotter pin 51, which also occupies the hole 49, having its lower ends spread in fixed relation to the base shell 10, holding the electric cord 23 from working through the hole 49, in or out.

Considering now the table top in sliding engagement with the stand, a block 52, has passing through its central hole 53, the stand member 17. In communication with the hole 53, in the top of the block 52, is a shallow recess 54 which is engaged by a bent end 55, of a curved leaf spring 56, which bears against the side of the stand member 17. Also positioned within the hole 53, of the block 52 is the curved leaf spring 57, having a tongue 58, anchored in a hole or pocket 59, in the block 52, to hold the spring 57 in its place, within the hole 53, of the block 52, while being in spring pressed frictional and sliding engagement with the stand member 17. Fixed on top of the block 52, and holding the bent end 55, of the spring 56, in the pocket or recess 54, is the table top 60, with a hole in its center, in line with the hole 53, of the block 52, for the passage of the member 17, up through the table top 60.

As another adaptation of the frictional use of the leaf spring 57, with its tongue 58, there is shown in Figure 7, an upright member 61, having in sliding engagement therewith, the transverse member 62, with a bearing part 63, through which is the hole 64, having in sliding engagement therewith the member 61. The curved leaf spring 57 is shown within the hole 64, having its tongue 58, engaging the transverse small hole 65, in the bearing part 63.

In use let us consider the functioning of the parts of the lamp stand and the table top above described, particularly the adjustment of these parts, relative to one another. Assume that the stand is completely assembled, as shown in Figure 1, and we are about to make the various possible adjustments. To begin with, if we consider the parts relatively placed some where between the lowest and the highest positions, as shown in Figure 1, with the electric cord fixed by the cotter pin 51 at the hole 49, in the base shell 10, and the cord in a slack condition as shown with small bends in the tubular member 13 and with larger bends in the larger tubular member 11, it is obvious that the cord 23, while moving with the following parts, the bowl 24, the handle 22 and the tubular member 17, there will be no tendency on the part of the cord to buckle within these parts, as it is not called upon to move relatively to them. However, where it occupies the lower tubular, fixed members, it must necessarily have a tendency to crowd back upon itself or buckle within these fixed parts, during the downward movement of the lower end of the member 17, thus shortening the distance which the cord part below member 17 must occupy between the floor and the lower end of the member 17. If the fixed member 11, were of the same inside diameter as the fixed member 13, it is evident that in such a length between the lower end of the movable member 17 and the floor, there would necessarily be more of a tendency on this lower part of the cord to crowd together and choke within the fixed tubular lower members and cause wear and tear and possible cutting of the cord insulation which might result in a short circuit between the two wires in the electric cord 23, than if the member 11 is made larger in bore than the bore of the member 13, thus giving additional freedom for the lower part of the cord 23, to form larger bends and thus better take up the slack in such formation and form less resistance to the downward movement of the cord parts immediately above and within the member 13.

Of course, it is true that sufficient freedom for cord slackness would be afforded by having one tubular member replace the members 11 and 13, of an internal diameter as large or larger than that of member 11, but such a tubular member would cost more than two tubular members, where the upper member is smaller in internal diameter than the lower member and the tendency of trade requirements is to have the tubular members of the adjustable and non-adjustable stands as slender as possible, both for appearance and economy. It is therefore an important and practical feature of my invention to have the member 13 of a smaller bore than the bore of the member 11. I might add that the drawing shows the width of the tubular parts drawn wider in relation to the length of these parts than they were in the actual commercial model from which the drawing was made. This distortion was made in the drawing to better illustrate the construction of these parts.

Considering the lower part of the cord 23, where it passes through the hole 49, the lacing of the cord 23 with the cotter pin 51 is particularly illustrated in Figure 5, as explained above in connection with a description of these parts. This construction affords a ready, practical and quickly assembled means of fixing the cord 23, at the hole 49, and by so fixing the cord to the stand base, I always maintain the right amount of cord within the stand for the requirements of its longitudinal adjustment.

Referring now to the manually adjusted frictioning means including the sleeve 15 and the packing 21, we have in these parts means for a delicate adjustment of the sliding friction between the movable and non-movable longitudinal parts of the stand affording opportunity of fixing such friction in amount for normally and continuously holding up the upper parts of the stand and their attachments, while permitting of an easy, manually forced, longitudinal adjustment of the parts. This adjustable frictional means also functions where there has to be supported by the stand a somewhat heavy lamp fixture and shade, so that the manufacturer of the lamp stand has in this adjustable frictional means a wide range of adaptability.

As a means for facilitating the hold of the one who operates the longitudinal adjustment of the stand, the handle 22 is more easily and firmly gripped by the hand than if this handle were replaced by an extension of the tube or pipe member 17 with its smooth surface. At the same time, the handle 22, properly designed, adds to the appearance of the stand.

Now let us consider the flanged bowl means 24, with attachments for supporting the lamps or bulbs and the shade. This means is designed to afford a compact and ornamental fixture part to facilitate the quick and simple threading of the electric cord 23 and its branch connections to the canopy switch 41 and the bulbs 46, by providing particularly a bowl cavity 47 and connecting cord passages 48 and 42, which open below at their juncture, so that the threading of these passages with the cord parts, is made easier by such open junction of the passages.

Referring to the means affording a vertical adjustment of the shade 38, relative to the bulbs 46, the split member 34, which may be a rod or a tube, frictions with the member 33 sufficiently to afford normal holding of the parts together from slipping, while permitting of an easy manual adjustment of the shade height, where it is desired to regulate the direction of the shadow cast by the shade 38, after adjusting the height of the lamps.

It is convenient, in connection with an adjustable lamp stand, to have a table top support for cigars, ash trays, etc., and to have this table top adjustable on the stand for height. The weight of the supported objects placed upon such a table top is comparatively small, and we are thus permitted to use frictional elements in connection of such a table top, which may be simple in construction and reliable for long use without resorting to any kind of a clamp. I have therefore devised two forms of curved leaf springs 56 and 57, having bent end formations to engage pockets or holes connected with the central hole in the block or part, as in 52 or 63 (see Figure 7) and through which passes the fixed longitudinal holding, stand member, 13 or 61, as the case may be, for anchorage of the leaf spring against movement within the part it occupies, while it is being slid on the stand member against which it exerts a normal holding friction to support a table top, as shown in Figure 1, or an arm as shown in Figure 7. If we dispense with all parts of the stand and attachments above the table top 60, of Figure 1, we will still have a stand with a vertically adjustable table top, and if such a table top is to be large, the frictioning leaf springs 56 and 57, can be made larger and stronger, according to the requirements. While I have shown two leaf springs 56 and 57 in the block 52, either of these springs can be dispensed with in this construction and the retained spring made to suit the requirements as shown in Figure 7, where only one leaf spring is used. For anchoring such leaf springs, one end can be bent as 55, on the spring 56, or a tongue 58, as on spring 57, can be formed for engaging a hole or pocket transverse to the hole in the block or part it occupies.

Various modifications can be made in the embodiments of my invention illustrated and above described without departing from the spirit and scope of my invention, I therefore wish to include all forms and modifications thereof which come within the purview of the following claims.

I claim,

1. An electric lamp stand including in combination, a base, a longitudinal upright member, electric bulbs, an electric cord and a disc flange centrally mounted upon said upright member, and extending radially out therefrom, a depressed pocket in the center of said flange, upstanding, electric, bulb supports on said flange, mounted thereon near its periphery, a cap, said cap covering the top of said pocket, said flange having vertical holes, in which are fixed said supports, said vertical holes opening on the underside of said flange, and other holes radiating from the hollow of said depressed pocket, forming cord passages, communicating with the lower open ends of said holes for facilitating the threading of said cord through said depressed pocket and its flange to connect with said bulbs.

2. A lamp stand made in accordance with claim 1, wherein said upright member includes a flanged portion, midway of its height, adapted to serve the purposes of a table.

3. A lamp stand made in accordance with claim 1, wherein said upright member is hollow between said disc member and said base, for the passage of said cord.

MORRIS OZLEK.